United States Patent [19]

Bestenreiner et al.

[11] 3,740,464

[45] June 19, 1973

[54] APPARATUS FOR SIMULTANEOUS REPRODUCTION OF IMAGES OF SELECTED SUPERIMPOSED PICTURES

[75] Inventors: Friedrich Bestenreiner, Grunwald; Reinhold Deml; Josef Helmberger, both of Munich; Josef Pfeifer, Uterhaching, all of Germany

[73] Assignee: Agfa-Gevaert Aktiengesellschaft, Leverkusen, Germany

[22] Filed: Mar. 18, 1971

[21] Appl. No.: 125,474

[30] Foreign Application Priority Data

Mar. 21, 1970 Germany.................. P 20 13 584.6

[52] U.S. Cl....... 178/6.8, 179/100.3 G, 350/162 SF

[51] Int. Cl......... G02b 5/18, G11b 7/16, H04n 7/18

[58] Field of Search................. 350/162 SF; 178/6.8

[56] References Cited

UNITED STATES PATENTS

| | | | |
|---|---|---|---|
| 2,829,199 | 4/1958 | Baracket et al. | 178/DIG. 28 |
| 3,561,859 | 2/1971 | Heckscher et al. | 350/162 SF |
| 3,549,237 | 12/1970 | Bouche et al. | 350/162 SF |
| 3,546,374 | 12/1970 | Grasser, Jr. | 350/162 SF |
| 3,549,238 | 12/1970 | Grasser, Jr. | 350/162 SF |

*Primary Examiner*—Howard W. Britton
*Attorney*—Michael S. Striker

[57] ABSTRACT

Images of two or more pictures which are exposed in superimposition upon each other on a record carrier in the presence of diffraction gratings are reproducible in an apparatus which employs at least one light source for each image. The light sources are offset with reference to the optical axis of the apparatus. The first diffraction orders of pairs of selected images are projected onto separate portions of a photocathode tube in a television camera or onto the photocathode tubes of two discrete television cameras so that the selected images can be viewed on separate portions of the picture tube of a single television receiver or on the picture tubes of two discrete television receivers.

18 Claims, 5 Drawing Figures

PATENTED JUN 19 1973 3,740,464

INVENTOR
FRIEDRICH BESTENREINER
REINHOLD DEML
JOSEF HELMBERGER
JOSEF PFEIFER
BY

Michael J. Striker
Attorney

APPARATUS FOR SIMULTANEOUS REPRODUCTION OF IMAGES OF SELECTED SUPERIMPOSED PICTURES

CROSS-REFERENCE TO RELATED APPLICATION

The apparatus of the present invention constitutes an improvement over and a further development of the apparatus which is disclosed in the commonly owned copending application Ser. No. 863,775 filed Oct. 6, 1969 by Bestenreiner et al. and entitled "Apparatus for the Reproduction of Superimposed Pictures."

BACKGROUND OF THE INVENTION

The present invention relates to apparatus for reproducing images of pictures, written or typed texts or analogous information (hereinafter called picutres) which is stored on a film or another suitable record carrier. More particularly, the invention relates to apparatus for reconstructing or reproducing images of selected ones of several pictures which are superimposed upon each other on a record carrier by employing diffraction gratings having different constants and/or different azimuth (theta) angles. Still more particularly, the invention relates to improvements in apparatus for simultaneously reconstructing the images of selected ones of a plurality of pictures which are superimposed upon each other on a common record carrier.

The copending application Ser. No. 863,775 of Bestenreiner et al. discloses a reconstructing apparatus which comprises means for focussing into a predetermined focal plane (Fraunhofer plane) all of the pictures which are superimposed upon each other on a record carrier so that the resulting diffraction orders of images of the superimposed pictures are separate from each other. The apparatus further employs selector means which is located in the focal plane and is adjustable to mask selected diffraction orders and to render at least two images visible, and an optical system for separately projecting the visible images so that the projected images are observable simultaneously. The diffraction orders of the images are located at the same distance from the optical axis. Thus, the focussing means must employ an objective having a relatively large aperture which suffices to simultaneously focus all of the pictures. Also, the selector means of the just discussed apparatus employ mechanical elements in the form of vanes, blades or the like so that the adjustment of such selector means requires a certain amount of time due to inertia of the movable Parts.

SUMMARY OF THE INVENTION

An object of the invention is to provide a reproducing or reconstructing apparatus for simultaneous projection of several images which can employ a relatively small objective and wherein the intervals which are required for selection of images to be shown on one or more screens or the like are substantially shorter than in presently available apparatus.

Another object of the invention is to provide the reconstructing apparatus with novel and improved selector means for images which are to be projected onto one or more screens or the like.

A further object of the invention is to provide a novel and improved apparatus for simultaneously projecting the images of several pictures which are superimposed upon each other on a common record carrier in such a way that the projected images can be seen on separate screens or on separate parts of a single screen or the like.

In accordance with a feature of the present invention, the selector means of the reproducing apparatus comprises a plurality of light sources, at least one for each of the pictures whose images are exposed on a record carrier in superimposition upon each other in the presence of diffraction gratings. The light sources are laterally offset with reference to the optical axis of the appartus and can be turned on or off to direct the first diffraction orders of the respective images in the general direction of the optical axis.

Each light source can produce diffraction orders of all superimposed images; however, all but one of the diffraction orders are spaced from the optical axis so that they cannot reach a relatively small aperture of the objective system. Furthermore, there is no need to employ mechanical parts in the spatial frequency plane.

The optical system of the reproducing apparatus can employ mirrors or a dichroic beam splitter and serves to project separate images onto separate portions of the photocathode tube in a television camera or onto the photocathode tubes of two discrete television cameras. The images can be viewed on separate portions of the picutre tube of a single television receiver or on the picture tubes of two discrete television receivers which can be placed sufficiently close to each other to permit simultaneous observation of both images.

The light sources may constitute incandescent lamps, electroluminescent diodes or selected spots of a cathode ray tube.

The novel features which are considered as characteristic of the invention are set forth in particular in the appended claims. The improved reconstructing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 2:
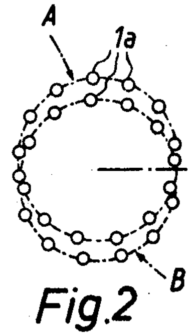
FIG. 2 is a front elevational view of a component of the selector means in the reconstructing apparatus as seen in the direction of arrow II in FIG. 1.
Figure 1:
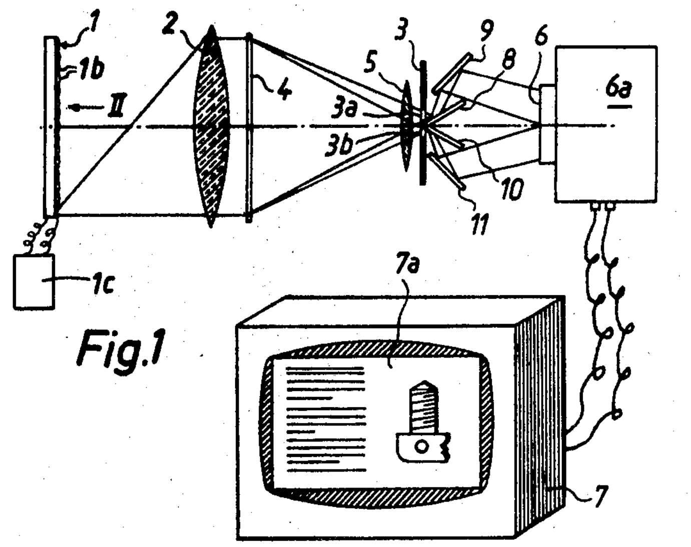
FIG. 1 is a plan view of an image retrieving or reconstructing apparatus which embodies one form of the invention.

Referring first to FIGS. 1 and 2, there is shown an apparatus for simultaneous presentation of images of several pictures which are superimposed upon each other on a record carrier 4. The selector means of this apparatus comprises a composite light source 1 including a plurality of discrete light sources **1*a*. As shown in FIG. 2, the light sources 1*a* form two circles A and B having their centers slightly offset from the optical axis of an objective 5 which focusses the picutres into a spatial frequency plane accommodating a diaphragm 3. The light sources 1***a* of each of the circles A and B constitute electroluminescent diodes, selected spots of a cathode ray tube which can be caused to emit light in response to signals, or groups of small incandescent lamps. Suitable collimating lenses 1*b* are employed to insure that the selected light sources 1*a* can effect uniform illumination of the record carrier 4 and of a collimating lens 2 which is located in front of the record carrier 4 and whose optical axis coincides with the optical axis of the objective 5. The record carrier 4 is assumed to carry seven superimposed pictures. This record carrier is obtained by exposing a photosensitive medium in the presence of diffraction gratings having different grating constants or in the presence of a single grating which is placed into a different angular position prior to each exposure. The photosensitive medium is thereupon exposed and bleached. Record carriers which can be used in the apparatus of the present invention are disclosed, for example, in the copending application Ser. No. 669,235 filed by Bestenreiner et al. and entitled "Arrangement for Recording and Reproducing Holograms of Moving Subjects."

The collimating lens 2 images the light sources 1*a* in the spatial carrier frequency plane which accommodates the diaphragm 3. This diaphragm has two apertures or openings 3*a* and 3*b* which are offset with reference to each other in such a way that, in response to illumination by the light sources 1*a* of the circle A, the first diffraction orders of the gratings on the record carrier 4 are deflected into the opening 3*b* and that, in response to illumination by the light sources 1*a* of the circle B, the first diffraction orders of the gratings are deflected into the opening 3*a*. The objective 5 is located in front of the diaphragm 3 and focusses the images into a reconstruction plane accommodating a screen 6. The latter forms part of a photocathode in a television camera 6*a* which is connected with a television receiver 7.

The light passing through the opening 3*a* of the diaphragm 3 is reflected by optical elements in the form of mirrors 8, 9 which direct the image onto a first part or section of the screen 6. The light which passes through the opening 3*b* is reflected by optical elements in the form of mirrors 10, 11 which direct the image against another part or section of the screen 6.

The composite light source 1 is connected with a suitable control unit 1*c* which can be manipulated by hand to cause emission of light by the selected light sources 1*a*.

The operation:

The control unit 1*c* can simultaneously complete the circuits of two light sources 1*a* in each of the circles A and B, namely, the circuits of two light sources 1*a* which form part of the circle A and are located diametrically opposite each other and the circuits of two light sources 1*a* which form part of the circle B and are also located diametrically opposite each other. In this way, the diffraction orders of all images are reproduced in the spatial carrier frequency plane; however, the diaphragm 3 permits only two images to reach the optical system 8–11 which is located between the diaphragm and the camera 6*a*. The optical system 8–11 serves to project the two images on separate sections of the screen 6. The opening 3*a* or 3*b* permits only the plus and minus first diffraction orders of an image to pass through the diaphragm 3 in response to activation of two light sources 1*a* in one of the circles A and B. By turning on a pair of light sources 1*a* in the other circle, the operator can illuminate the same picture or another picture in such a way that the diffracted reconstructing beam enters the corresponding opening 3*a* or 3*b* of the diaphragm 3. The mirrors 8, 9 reflect light which passes through the opening 3*a*, and the mirrors 10, 11 reflect light which passes through the opening 3*b*. The mirrors 9, 11 direct the two images onto separate sections of the screen 6. These images are seen on separate sections of the tube 7*a* in the receiver 7. For example, one of the images can represent one or more parts of a machine or instrument, and the other image can represent descriptive matter pertaining to the illustrated part or parts.

The just described apparatus is especially suited for reproduction of technical information in schools and other educational institutions, for use by lecturers, and for similar purposes. For example, the record carrier 4 can store pictures of several pages of descriptive text in a given book and the pictures of several details of a machine which are depicted on separate pages of the same book. The teacher or lecturer can simultaneously project the image of a structure which can be found on a first given page of the book and the relevant descriptive matter which is to be found on a second page of the same book. The pictures on the record carrier 4 can represent information which was taken from two or more different books.

The number of light sources 1*a* can be reduced in such a way that each of the two groups or sets of light sources (circles A and B) includes a single light source 1*a* for each picture of the record carrier 4 whereby the two groups of light sources form two semicircles. Thus, the light sources 1*a* of the first group extend along a first arc of 180 degrees, and the light sources 1*a* of the second group extend along a second arc of 180 degrees. Doubling or multiplying of the number of light sources in each group brings about the advantage that the brightness of images on the screen is a multiple of the brightness which is obtainable with one light source for each picture. This is due to the fact that, when the groups A and B comprise two light sources 1*a* for each picture of the record carrier 4, the plus and minus first diffraction orders of each image are available for reproduction. Furthermore, the composite light source 1 insures uniform illumination of the record carrier 4 even if the light impinges on the carrier at an acute angle.

Figure 4:
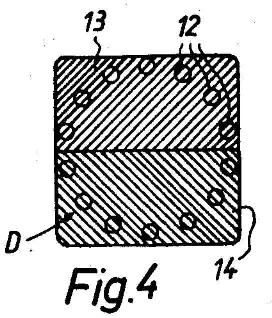
FIG. 4 is a front elevational view of a component of the selector means in the second apparatus as seen in the direction of arrow IV in FIG. 3.
Figure 3:
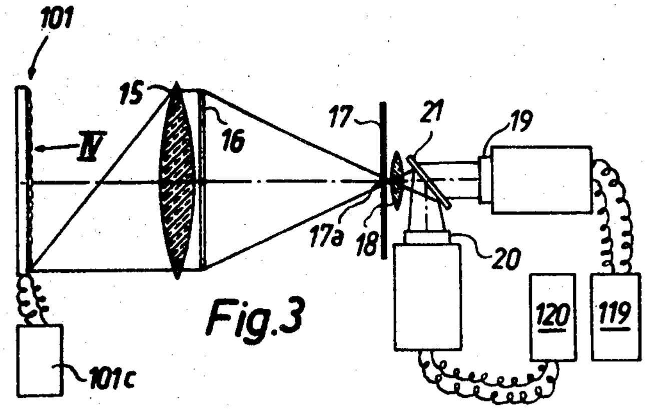
FIG. 3 is a plan view of a second apparatus.

In the apparatus of FIGS. 3 and 4, the composite light source 101 of the selector means comprises a single circular group D of light sources 12. The center of the circle D is located on the optical axis of the apparatus. The upper half of the circle D is overlapped by a first color filter 13 (e.g., a red filter) and the lower half of the circle D is overlapped by a second color filter 14 (e.g., a green filter). The radius of the circle D is such that, depending on the constant of the diffraction grating which is depicted on the record carrier 16, the first diffraction orders are directed into the opening 17*a* of a diaphragm 17 which is located in the spatial carrier frequency plane. The opening 17*a* has its center on the optical axis. The record carrier 16 is located behind a collimating lens 15 and the diaphragm 17 is shown as being located in front of an objective 18. However, the objective 18 can be placed in front of the diaphragm 17. A dichroic beam splitter 21 is lcoated behind the objective 18 in a plane which makes an angle of 45 degrees with the optical axis of the apparatus. The images are focussed onto the screens of two television cameras 19 and 20.

The operation of the apparatus shown in FIGS. 3 and 4 is as follows:

The control unit 101*c* can complete the circuit of a selected light source 12 behind the red filter 13 and the circuit of a selected light source 12 behind the green filter 14. When a light source 12 behind the filter 13 emits light, it can cause a certain diffraction order (e.g., the plus first order) of the corresponding picture on the record carrier 16 to pass through the central opening 17*a* of the diaphragm 17. The red light which passes through the objective 18 is deflected by the beam splitter 21 so that it impinges on the screen of the camera 20. The light which issues from a light source 12 behind the green filter 14 and which causes a diffraction order of a picture on the record carrier 16 to pass through the opening 17*a* of the diaphragm 17 and objective 18 is permitted to pass through the beam splitter 21 and to reach the screen of the camera 19. The cameras 19 and 20 transmit two discrete images which can be seen on the picture tubes of two discrete television receivers 119, 120. The receivers 119, 120 are sufficiently close to each other to permit simultaneous observation of the two images.

By selecting the light sources 12 behind the color filters 13 and 14, the operator can select that picutre on the record carrier 16 the minus first diffraction order of which is focussed on the screens of the cameras 19 and 20.

The additive color filters 13 and 14 with non-overlapping transmission zones can be replaced with polarizing filters whose directions of polarization make an angle of 90 degrees.

The reproduction of images on the tube of a television camera brings about the important advantage that a picture of relatively low intensity can be readily seen in a brightly illuminated room. Another advantage is that, when using record carriers for images multiplied with a linear diffraction grating having only two grades of darkness, one can resort to a signal amplification which can correct certain errors due to overlapping on the record carrier. This is shown in FIGS. 5*a* and 5*b*.

Figure 5:
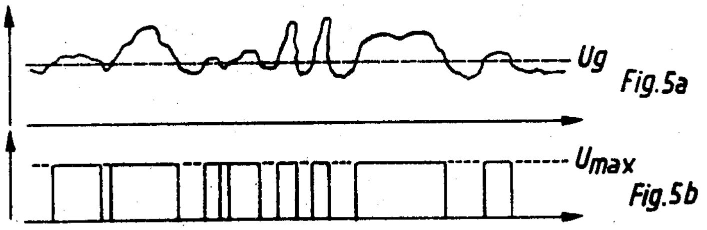
FIG. 5 (composed of FIGS. 5*a* and 5*b*) is a diagram illustrating the mode of operation of a signal amplifier system in the reconstructing apparatus of FIG. 1 or 3.

FIG. 5*a* shows one form of a signal along a row of dots on the screen 6. It will be seen that, in a certain region of the illustrated row, there appear practically all signal intensities even though the original exhibits essentially only 2 degrees of lightness, namely, black and white. By resorting to a trigger circuit of known design, the signals can be amplified in a manner as shown in FIG. 5*b*, namely, so that all signals above a value Ug are amplified to a maximum value Umax and that all signals below the value Ug are suppressed. This results in a brilliant image which can be readily interpreted even if the image on the photocathode of the camera is one of relatively flat gradation.

The method of storing on a record carrier a plurality of pictures by resorting to diffraction gratings with different constants or to a diffraction grating in different angular positions necessitates the superimposition of negative images. This is desirable in order to insure the storage of a substantial number of pictures on a single record carrier. However, the reading of tests wherein the characters appear in white color on a dark background is tiresome to the eyes of observers who are accustomed to seeing dark characters on a white background. The reconstruction of images with television cameras and receivers renders it possible to resort to a conventional electronic image reversing technique so that the receiver furnishes positive images.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims

We claim:

1. Apparatus for selective reproduction of images of several pictures which are exposed in superimposition upon each other on a record carrier in the presence of diffraction gratings, comprising focussing means arranged to focus into a predetermined plane all of the images which are superimposed on a record carrier so that the resulting diffraction orders of said images are separate from each other; selector means operable to render at least two of said images visible, said selector means comprising a plurality of light sources, at least one for each of said superimposed images and laterally spaced from the optical axis of the apparatus to direct the first diffraction orders of the respective visible images in the general direction of said optical axis, said light sources being arranged in two groups and said selector means further comprising a diaphragm located in said plane and having a pair of openings respectively arranged to transmit diffraction orders of images directed by the light sources of said first and second groups; and optical means located in the region of said plane for separately projecting said visible images so that the thus projected images are observable simultaneously, said optical means being arranged to project light passing through said openings onto separate portions of a screen.

2. Apparatus as defined in claim 1, wherein each of said groups forms a circle and wherein the centers of said circles are slightly offset with reference to said optical axis.

3. Apparatus as defined in claim 1, wherein said images are negative images and further comprising television camera means having at least one photocathode tube positioned in the image plane of said optical means and television receiver means connected with said camera means, said receiver means comprising electronic image reversing means.

4. Apparatus as defined in claim 1, wherein said light sources are electroluminescent diodes.

5. Apparatus as defined in claim 1, wherein said light sources are incandescent lamps and said selector means further comprising a collimating lens for each of said lamps.

6. Apparatus as defined in claim 1, further comprising television camera means having at least one photocathode tube positioned in the image plane of said optical means and including said screen.

7. Apparatus as defined in claim 6, further comprising television receiver means connected with said camera means.

8. Apparatus for selective reproduction of images of several pictures which are exposed in superimposition upon each other on a record carrier in the presence of diffraction gratings, comprising focussing means arranged to focus into a predetermined plane all of the images which are superimposed on a record carrier so that the resulting diffraction orders of said images are separate from each other; selector means operable to render at least two of said images visible, said selector means comprising a plurality of light sources, at least one for each of said superimposed images and laterally spaced from the optical axis of the apparatus to direct the first diffraction orders of the respective visible images in the general direction of said axis, said light sources forming at least one circle having its center on said optical axis and said selector means further comprising first and second filter means for the light sources for the plus first and minus first diffraction orders; and optical means located in the region of said plane for separately projecting said visible images so that the thus projected images are observable simultaneously, said optical means comprising additional filter means located behind said plane for separating said plus first and minus first diffraction orders.

9. Apparatus as defined in claim 8, wherein said first and second filter means respectively comprise first and second additive color filters.

10. Apparatus as defined in claim 8, wherein said images are negative images and further comprising television camera means having at least one photocathode tube positioned in the image plane of said optical means and television receiver means connected with said camera means, said receiver means comprising electronic image reversing means.

11. Apparatus as defined in claim 8, wherein said light sources are electroluminescent diodes.

12. Apparatus as defined in claim 8, wherein said light sources are incandescent lamps and said selector means further comprises a collimating lens for each of said lamps.

13. Apparatus as defined in claim 8, wherein said first and second filter means respectively comprise first and second polarizing filters.

14. Apparatus as defined in claim 13, wherein said additional filter means comprises a dichroic beam splitter.

15. Apparatus as defined in claim 8, further comprising first and second television camera means having photocathodes positioned to constitute screens for the images projected by said optical means, and discrete first and second television receiver means respectively connected with said first and second camera means.

16. Apparatus as defined in claim 15, wherein said first and second receiver means are adjacent to each other for simultaneous observation of pictures.

17. Apparatus for selective reproduction of images of several pictures which are exposed in superimposition upon each other on a record carrier in the presence of diffraction gratings having only two grades of darkness, comprising focussing means arranged to focus into a predetermined plane all of the images which are superimposed on a record carrier so that the resulting diffraction orders of said images are separate from each other; selector means operable to render at least two of said images visible, said selector means comprising a plurality of light sources, at least one for each of said superimposed images, said light sources being laterally spaced from the optical axis of the apparatus and being arranged to direct the first diffraction orders of the respective visible images in the general direction of said optical axis; optical means located in the region of said plane for separately projecting said visible images so that the thus projected images are observable simultaneously; television camera means having at least one photocathode tube positioned in the image plane of said optical means; and television receiver means connected with said camera means and having means for amplifying to a predetermined maximum value all signals whose intensity exceeds a preselected value and for suppressing all signals whose intensity is below said preselected value.

18. Apparatus as defined in claim 17, wherein said amplifying means comprises a trigger conduit.

* * * * *